United States Patent [19]
Kao

[11] Patent Number: 5,788,088
[45] Date of Patent: Aug. 4, 1998

[54] STACKABLE CD RACK

[76] Inventor: Kuo-Ming Kao, 5th Floor, No. 357, Section 4, Jen Ai Road, Taipei City, Taiwan

[21] Appl. No.: 710,855

[22] Filed: Sep. 23, 1996

[30] Foreign Application Priority Data

Aug. 19, 1996 [TW] Taiwan ................... 85212681

[51] Int. Cl.⁶ ................................................ A47F 5/00
[52] U.S. Cl. ...................... 211/40; 211/194; D6/407; 206/308.1
[58] Field of Search .................... 211/40, 194, 41.12, 211/188; 206/387.15, 308.1; D6/407; 312/9.9

[56] References Cited

U.S. PATENT DOCUMENTS

| | | | |
|---|---|---|---|
| D. 360,098 | 7/1995 | Todd | D6/407 X |
| 5,370,243 | 12/1994 | Rosario | 211/40 |
| 5,568,873 | 10/1996 | Gioscia | 211/40 |
| 5,577,620 | 11/1996 | Jacob | 211/40 |
| 5,584,397 | 12/1996 | Cheng | 211/40 |

*Primary Examiner*—Robert W. Gibson, Jr.
*Attorney, Agent, or Firm*—Bacon & Thomas

[57] ABSTRACT

A stackable CD rack including a base body, a cylindrical back column, two cylindrical front columns and multiple support plates. The base body is a substantially equiangular triangle body. Each corner of the base body is formed with a downward dented column hole for the cylindrical columns to insert therein. Each supporting plate has three arch notches with each notch having a T-shaped projection. The T-shaped projections of multiple supporting plates are sequentially stacked in the column holes of the base body and then the cylindrical columns are inserted into the column holes of the base body with the vertical channels facing inward. The T-shaped projections of the supporting plates are engaged in the vertical channels of the cylindrical column bodies to form the CD rack with multiple layers of inclined spaces for containing the CD boxes.

4 Claims, 8 Drawing Sheets

STACKABLE CD RACK

BACKGROUND OF THE INVENTION

The present invention relates to an inclined type stackable CD rack in which the existing CD boxes can be more easily and reliably stored. The CD racks are compatible with each other so that several CD racks can be stacked into a unit with larger capacity.

Figure 9:
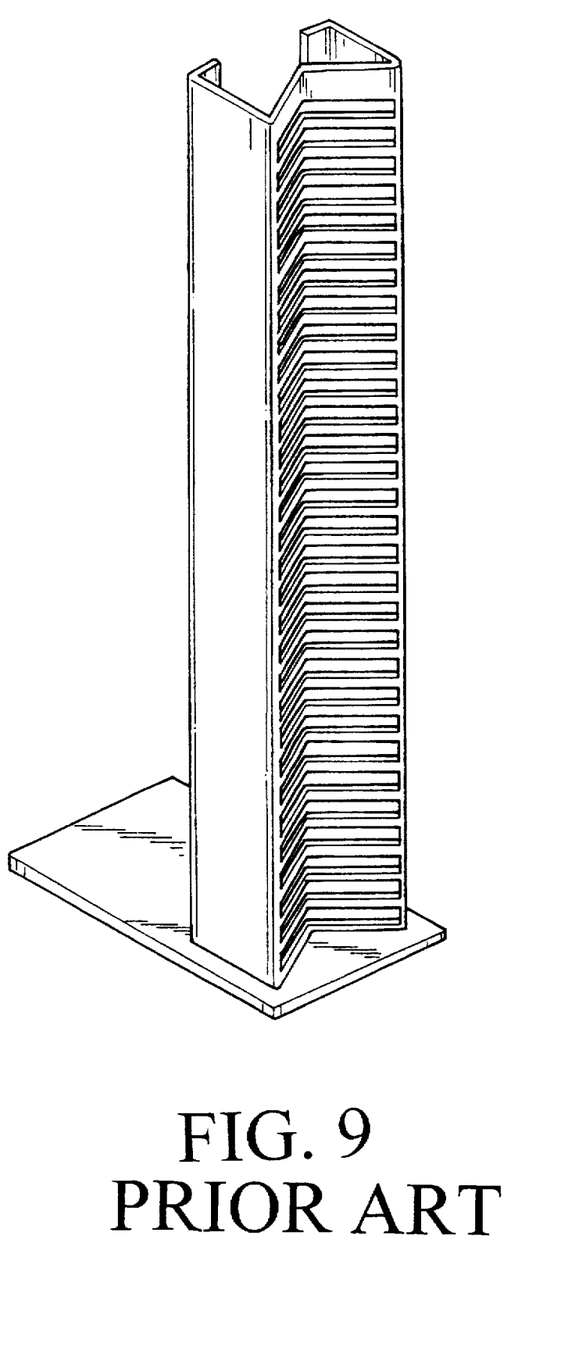
FIG. 9 shows a conventional CD rack.

A variety of CD racks, CD cabinets or other CD storage appliances are commercially available. In order to create amusing and attractive appearances, various kinds of CD racks with unique and fashionable profiles and patterns have been developed, while sacrificing the convenience in production, transferring and use of the CD racks. For example, FIG. 9 shows a conventional CD rack which is made of a single rectangular thin iron plate by punching the same into a U or M-shaped pattern. Such CD rack is formed with multiple slots having a thickness substantially equal to that of the CD box for inserting the CD boxes thereinto. A base body is disposed at the bottom of the rack, enabling the rack to stand upright. Such CD rack cannot be disassembled into small components for easy transferring. Moreover, a large spaces is uneconomically occupied when storing such CD racks.

Another conventional CD rack is composed of multiple column bodies or lateral walls and multiple supporting plates assembled therewith by insertion. The column bodies or lateral walls are formed with multiple equally spaced channels for sequentially inserting the supporting plates therein to form multiple chambers for receiving the CD boxes. In the manufacturing procedure of a CD rack, it is troublesome and complicated to form the channels and assemble the supporting plates into the channels. This increases the cost for the product and reduces the competitive ability of the product. Moreover, after a period of use, the supporting plates are apt to detach from the channel. This often makes the CD rack loosen or even come apart.

SUMMARY OF THE INVENTION

It is a primary object of the present invention to provide an inclined type stackable CD rack which can be stacked one on the other to enlarge the capacity for the CD boxes. The CD rack has a fashionable appearance and can be easily manufactured and packed as well as transferred in a more economical and effective manner. Moreover, the components of the CD rack can be easily assembled by a user. Therefore, the cost for production and storage of the CD rack is greatly reduced. This makes it possible to mass-produce the CD rack.

According to the above object, the CD rack of the present invention includes a base body, a cylindrical main column, two cylindrical lateral columns and multiple support plates.

The base body is a substantially equiangular triangular body with a certain height and three arch sides. Each corner of the base body is formed with a downward dented column hole. A partitioning plate is respectively disposed in each column hole to divide the same into upper and lower cavities for the cylindrical main column and lateral column to tightly inserted therein. The upper cavity of each of the column holes is formed with an arch recess. Two T-shaped pad blocks are respectively disposed between the left and right column holes and the arch recesses. The base body is further formed with a rectangular sink with a slope face for receiving a lowermost CD box. The main column and the lateral columns are formed with vertical channels for receiving the supporting plates therein. Each supporting plate has three arch notches. The curvature of the inner edge of each arch notch coincides with the arch face of the main column and lateral columns. Each arch notch is integrally formed having a T-shaped projection with a thickness slightly larger than that of the CD box. The top face of the T-shaped projection is formed with a locating hole, while the bottom face thereof is disposed with a tenon for fitting into the locating hole of a downward supporting plate. The back side of each T-shaped projection is formed with a convex section, whereby the T-shaped projections can be more firmly stacked. Moreover, the T-shaped projections are parallel to each other and inclined from the supporting face by an angle. Two T-shaped pad blocks are respectively disposed between the left and right column holes and the arch recesses, whereby the supporting plates are retained between the cylindrical column bodies by an inclination.

In use, the T-shaped projections of multiple supporting plates are sequentially stacked in the column holes of the base body. After being stacked to a desired height, the cylindrical column bodies are inserted into the column holes of the base body with the vertical channels facing inward. At this time, the T-shaped projections of the supporting plates are just received in the vertical channels of the cylindrical column bodies to form the CD rack with multiple layers of rooms for containing the CD boxes. The filling blocks are filled into the remaining space of the vertical channels so as to reinforce the entire structure and prevent the supporting plates from detaching from the cylindrical column bodies. Several CD racks can be stacked together in such a manner that the cylindrical column bodies are inserted into the lower cavities of the base body of a lower CD rack and overlaid thereon to form a CD rack with an enlarged capacity.

The present invention can be best understood through the following description and accompanying drawings, wherein:

BRIEF DESCRIPTION OF THE DRAWINGS

FIG. 5A is a bottom view of FIG. 5;

DETAILED DESCRIPTION OF THE PREFERRED EMBODIMENT

Please refer to FIGS. 1 to 4. The CD rack of the present invention includes a base body 10, a back column 20, two front columns 30, 40, multiple support plates 50 and several filling blocks 60. The base body 10 is a substantially equiangular triangular body with a certain height and three arch sides. Each corner of the base body 10 is formed with a downward dented column hole 102, 103, 104 (referring to FIGS. 4 and 7). Two partitioning plates 102C, 104C are respectively disposed in the column holes 102, 104 to divide the same into upper cavities 102A, 104A and lower cavities 102B, 104B, whereby the cylindrical back column and front columns 20, 40 can be tightly inserted therein. In addition, the upper cavity of each of the column holes 102, 103, 104 is formed with an arch recess 105, 106, 107. Two T-shaped pad blocks 108, 109 are respectively disposed within the front column holes 103, 104 and the arch recesses 106, 107. The arch recesses 105, 106, 107 are respectively formed with locating holes 105A, 106A, 107A corresponding to the tenons 59 (referring to FIGS. 5 and 5A) of T-shaped projections 54, 55, 56 (referring to FIG. 3) of the supporting plate 50, whereby the tenons can be inserted into the locating holes. The base body 10 is further formed with a rectangular sink 15 having a downwardly sloping bottom for receiving a lower most CD box.

Figure 6:
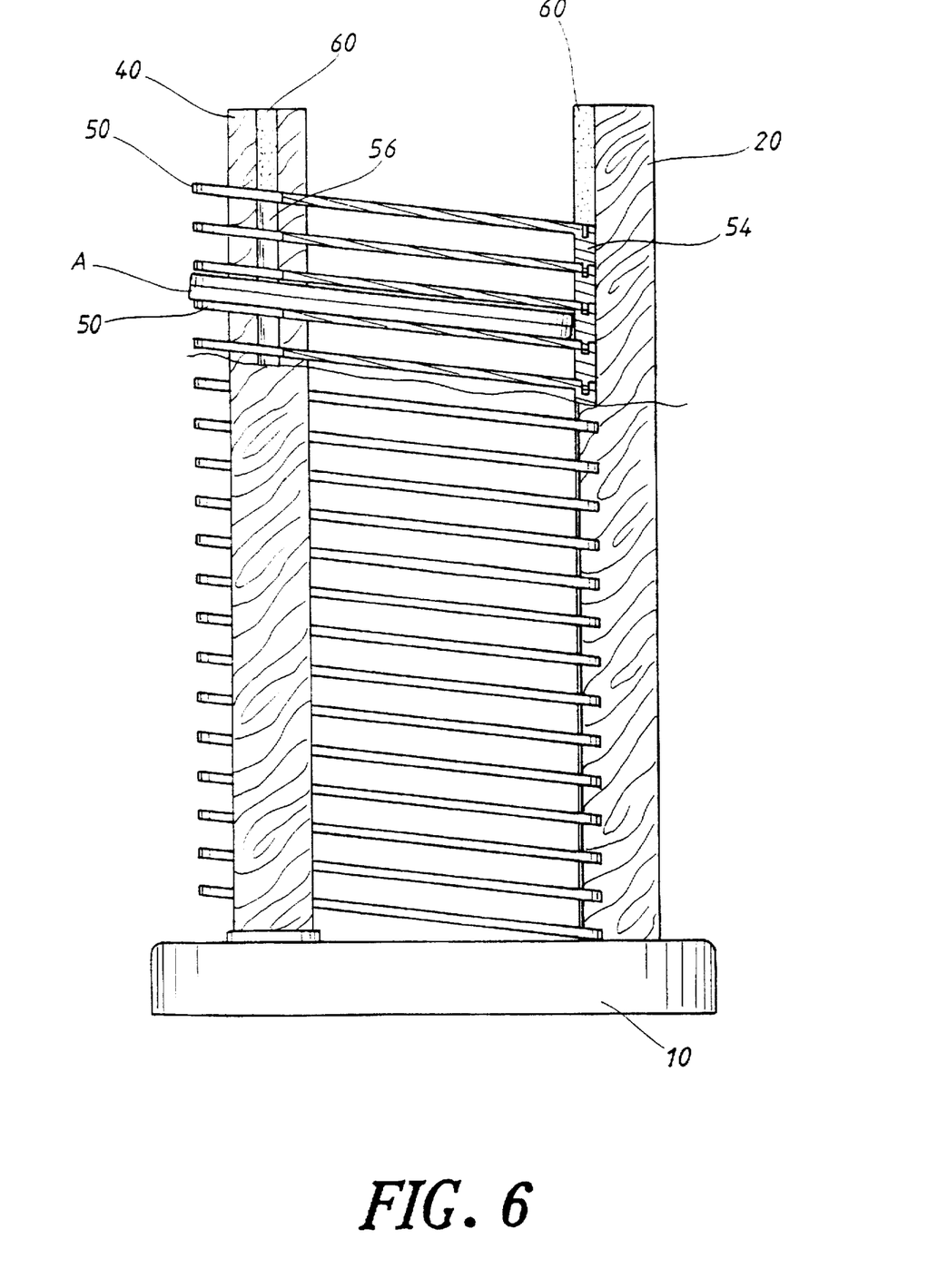
FIG. 6 is a side sectional view of the present invention.

When assembled, after several supporting plates 50 are stacked to a certain height, the back column 20 is inserted in the column hole 102 of the top of the base body 10, while the two front columns 30, 40 are inserted in the other two column holes 103, 104 and spaced by a distance for receiving a CD box A as shown in FIG. 6. The back column 20 and the front columns 30, 40 are formed with vertical channels 21, 31, 41 for receiving the supporting plates 50 therein.

Figure 1:
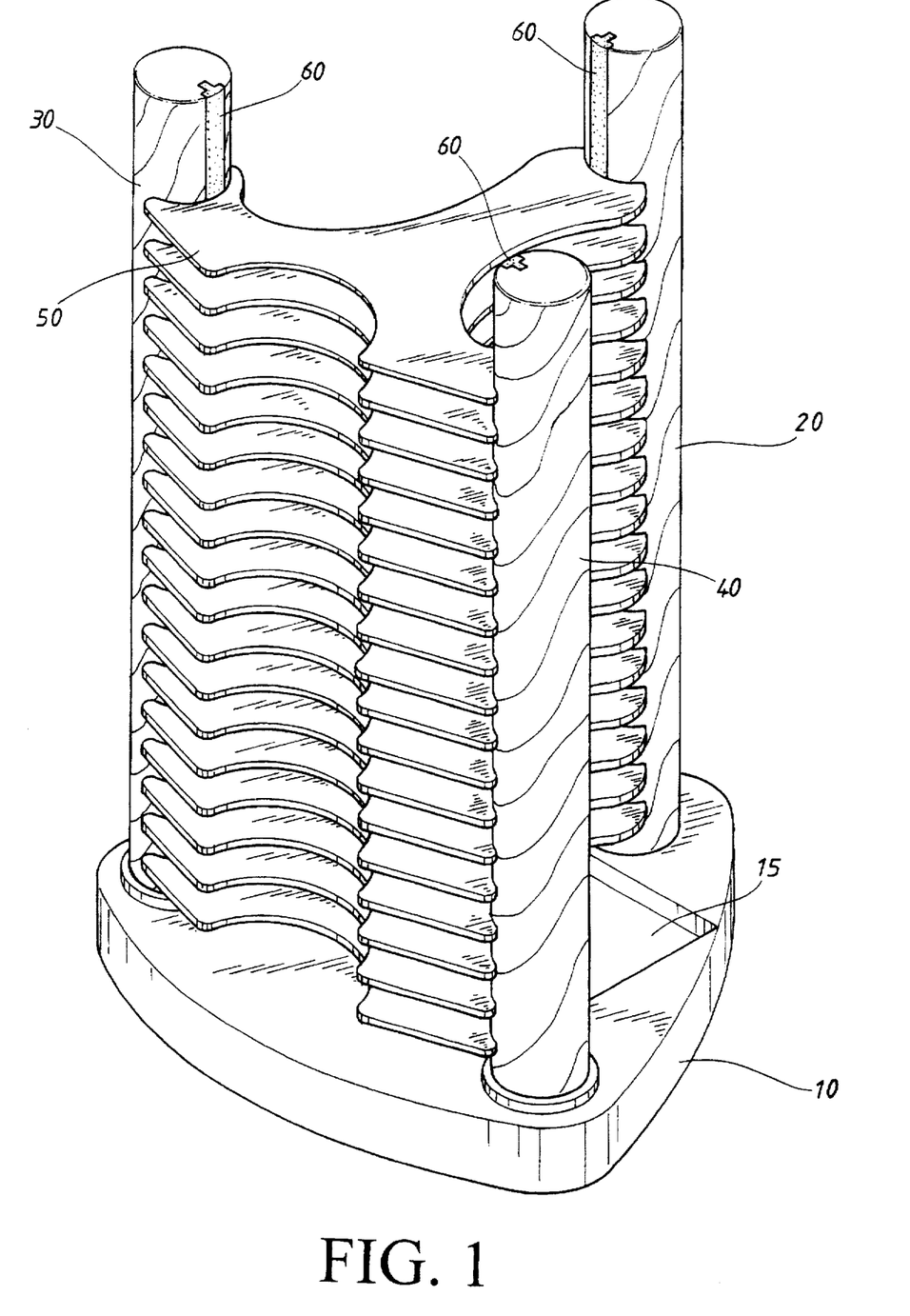
FIG. 1 is a perspective assembled view of the present invention.
Figure 2:
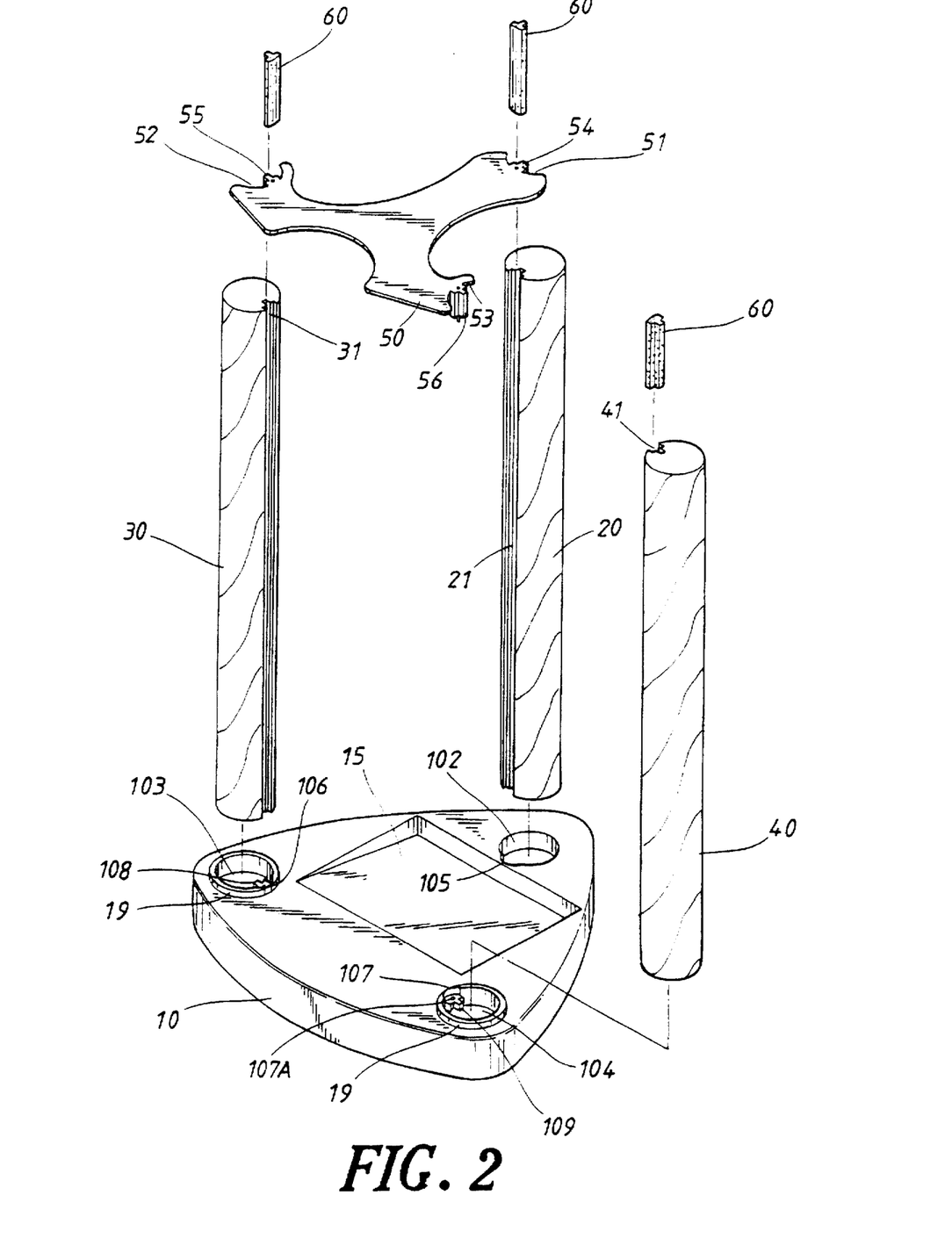
FIG. 2 is a perspective exploded view of the present invention.
Figure 3:
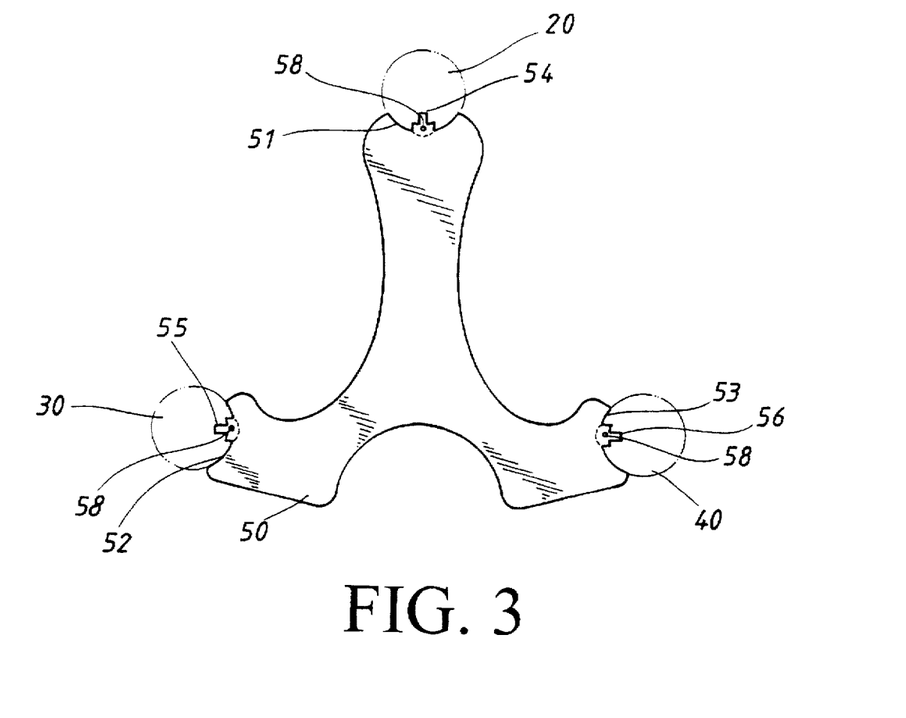
FIG. 3 is a top view of the supporting plate of the present invention.
Figure 4:
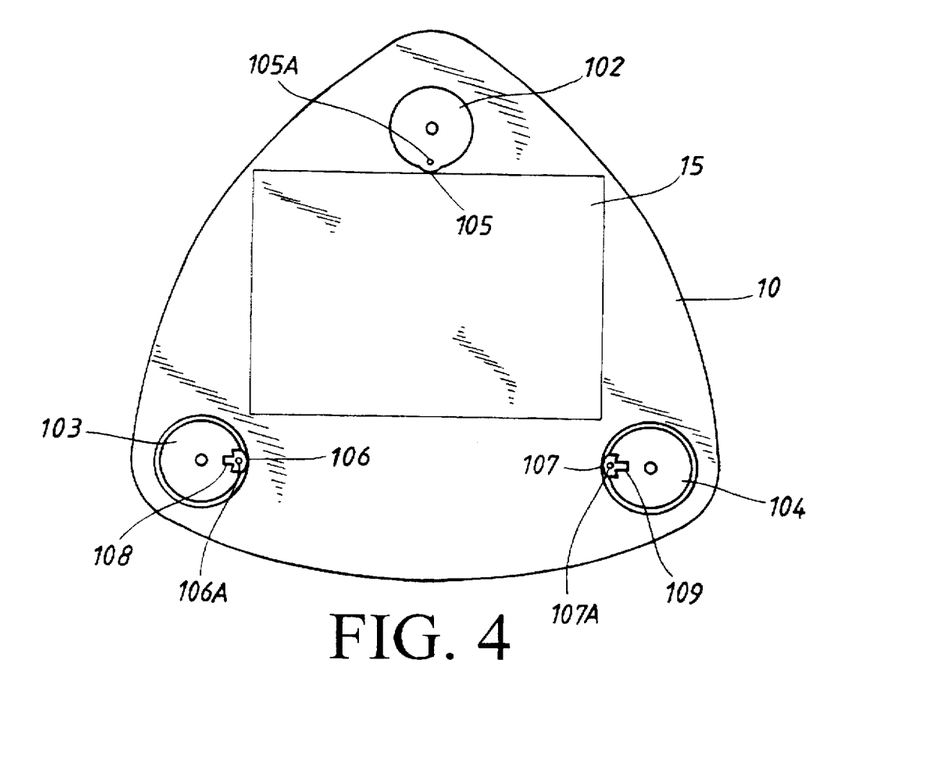
FIG. 4 is a top view of the base body of the present invention.
Figure 5:
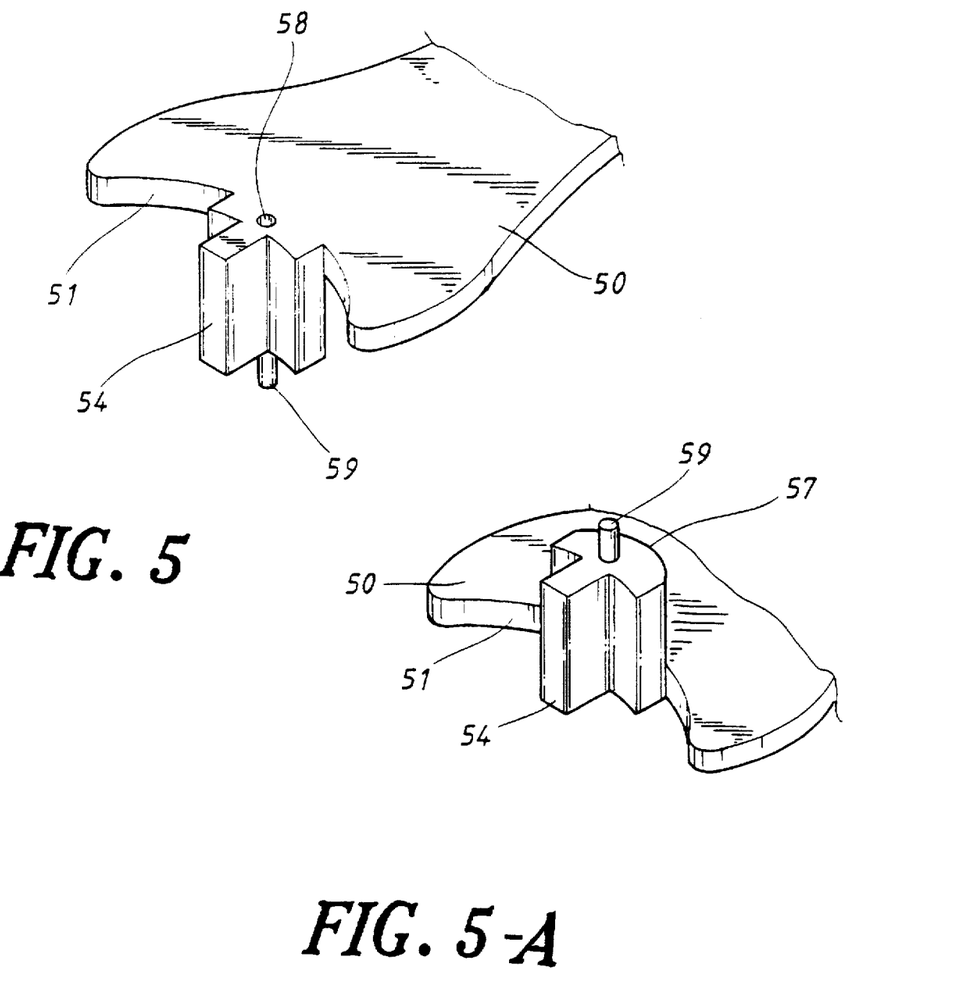
FIG. 5 is an enlarged partial perspective view showing the T-shaped projection of the supporting plate of the present invention.

Referring to FIGS. 3, 5 and 5A, the supporting plate 50 has three arch notches 51, 52, 53. The curvature of the inner edge of each arch notch 51, 52, 53 coincides with the arch face of the back column 20 and front columns 30, 40. Each arch notch 51, 52, 53 is integrally formed with a T-shaped projection 54, 55, 56 with a thickness slightly larger than that of the CD box. The T-shaped projections can be snugly received in the vertical channels 21, 31, 41 of the cylindrical column bodies 20, 30, 40, whereby after the T-shaped projections 54, 55, 56 are stacked together, each two adjacent supporting plates define a space with a height for receiving the CD box. The top face of each T-shaped projection 54, 55, 56 is disposed with a locating hole 58, while the bottom face thereof is correspondingly disposed with a tenon 59 for fitting into the locating hole of a downward supporting plate 50. The back side of each T-shaped projection 54, 55, 56 is formed with a convex section 57, whereby the T-shaped projections 54, 55, 56 can be more firmly stacked. Moreover, the longitudinal axes of the T-shaped projections 54, 55, 56 are parallel to each other and inclined from the supporting face at an angle. Two T-shaped pad blocks 108, 109 are respectively disposed between the left and right column holes 103, 104 and the arch recesses 106, 107, whereby the supporting plates 50 are retained between the cylindrical column bodies 20, 30, 40 at an inclination from back body 20 towards front bodies 30 and 40, as particularly shown in FIG 6.

Figure 7:
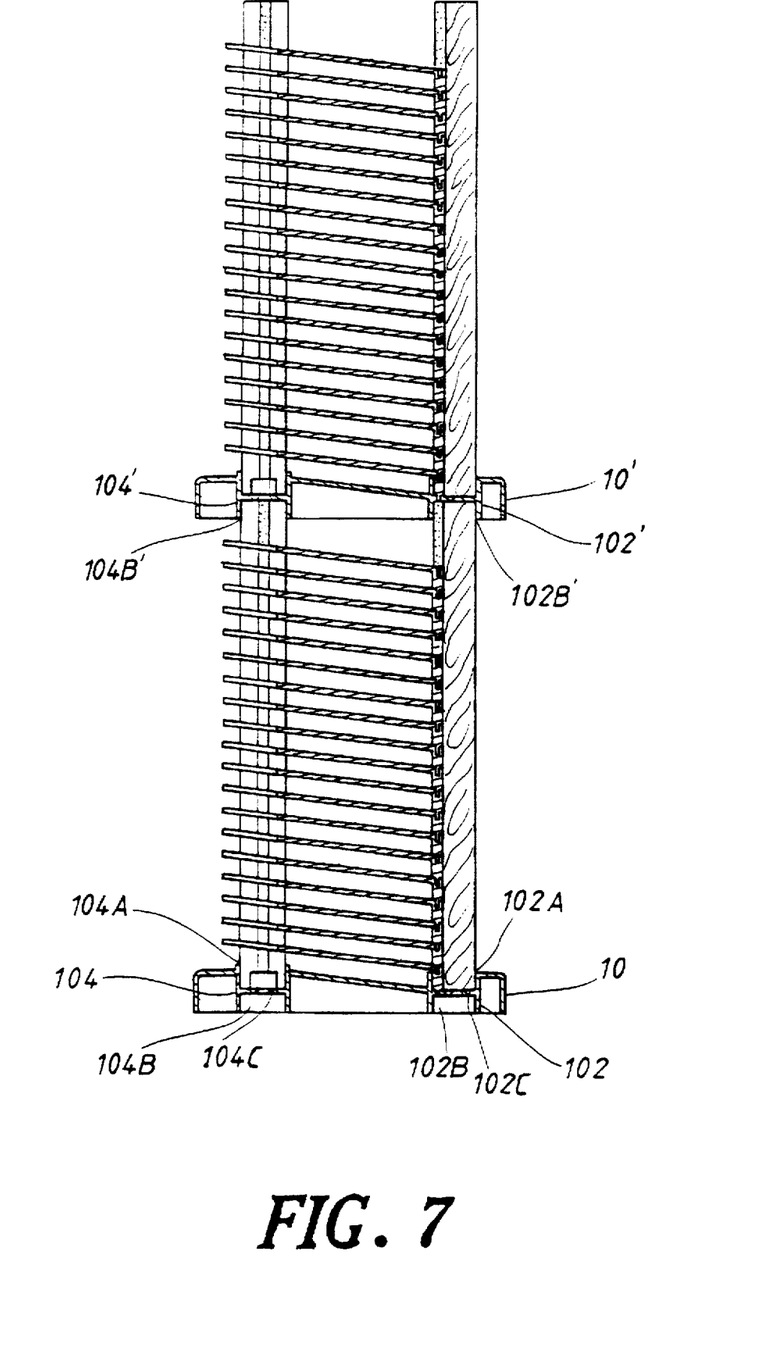
FIG. 7 is a sectional view showing two CD racks stacked into a unit.
Figure 8:
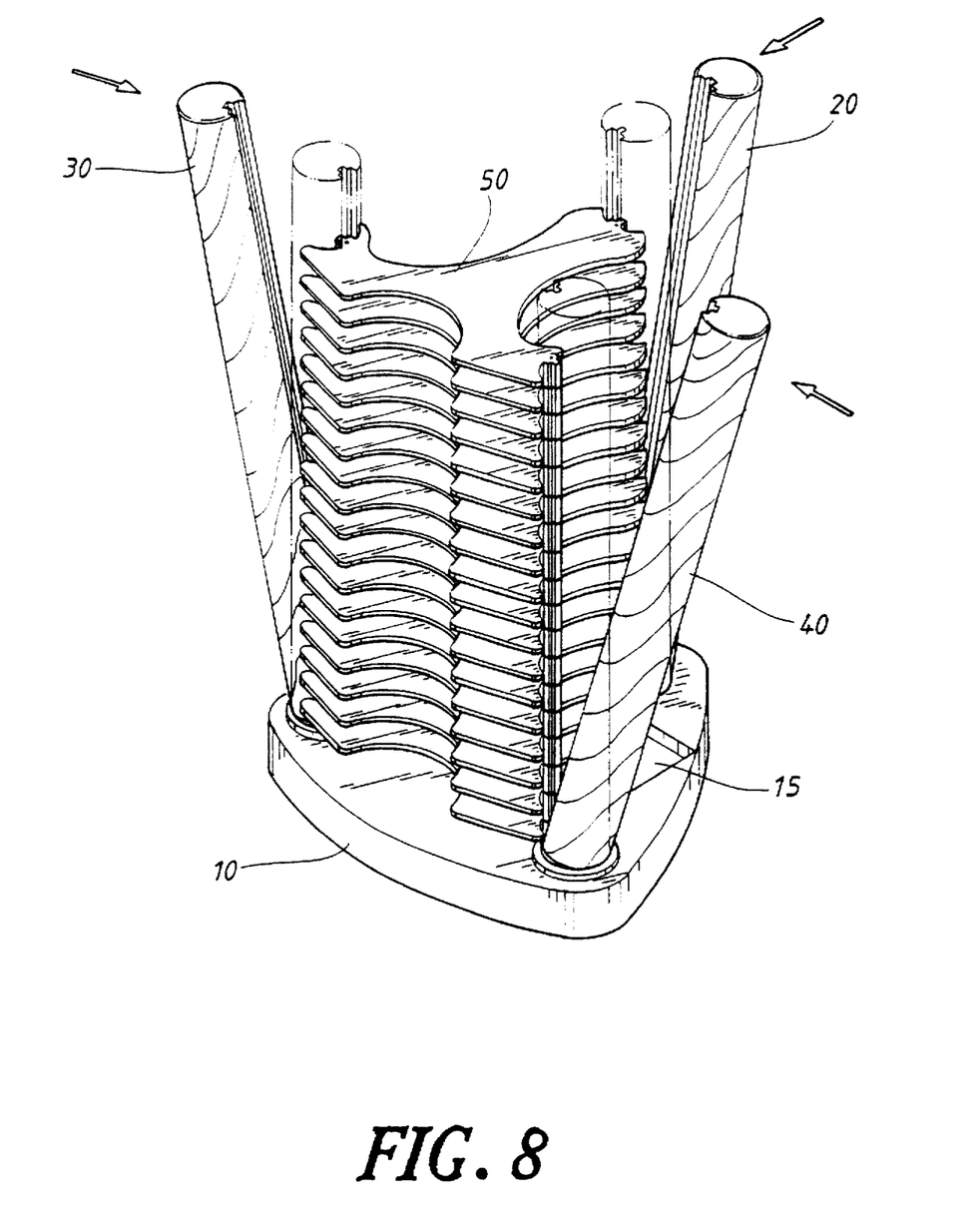
FIG. 8 is a perspective view showing the connection between the cylindrical columns, supporting plates and base body of the present invention.

Referring to FIGS. 6, 7 and 8, in use, the T-shaped projections 54, 55, 56 of multiple supporting plates 50 are sequentially stacked in the column holes 102, 103, 104 of the base body 10. After being stacked to a desired height, the cylindrical column bodies 20, 30, 40 are inserted into the column holes 102, 103, 104 of the base body 10 with the vertical channels 21, 31, 41 facing inward. At this time, the T-shaped projections 54, 55, 56 of the supporting plates 50 are engaged in the vertical channels 21, 31, 41 of the cylindrical column bodies 20, 30, 40 to form the CD rack with multiple layers of inclined spaces for containing the CD boxes. The height of the stacked supporting plates 50 is preferably close to but less than the height of the cylindrical column bodies 20, 30, 40. The filling blocks 60 are filled into the remaining space of the vertical channels 21, 31, 41 so as to reinforce the entire structure and prevent the supporting plates 50 from detaching from the cylindrical column bodies.

Referring to FIG. 7, several CD racks can be stacked together in such a manner that the top ends of the cylindrical column bodies 20, 30, 40 are inserted into the lower cavities 102', 104' of the base body 10' of an adjacent CD rack and overlaid thereon to form a CD rack with enlarged capacity.

According to the above arrangements, the CD rack of the present invention can be easily manufactured and Packed as well as transferred in a more economical and effective manner. Moreover, the components of the CD rack can be easily assembled by a user himself. Also, the CD racks are compatible with each other so that multiple CD racks can be stacked into an integral unit with larger capacity. Therefore, the cost for production and storage can be greatly reduced.

It should be noted that the above description and accompanying drawings are only used to illustrate one embodiment of the present invention, and not intended to limit the scope thereof. Any modification of the embodiment should fall within the scope of the present invention.

What is claimed is:

1. A stackable CD rack comprising:

a) a base body of substantially equiangular triangular configuration having three arch sides defining a pair of front corners and a back corner, each corner having a column hole formed therethrough, an arch recess formed in each column hole, a partition plate disposed in each of the front column holes for dividing each front column hole into an upper cavity and a lower cavity, and a T-shaped pad block disposed in the arch recess of each front column hole;

b) a pair of front column bodies and a back column body, each column body having an arch face and a vertical channel formed therein, a bottom end of each front column body being engageable in the upper cavity of each front column hole, a bottom end of the back column body being engageable in the back column hole, and the T-shaped pad blocks of the front column holes being receivable within the vertical channels of the front column bodies;

c) a plurality of supporting plates, each plate including a pair of front arch notches and a back arch notch, the curvatures of the arch notches corresponding to the curvatures of the arch faces of the column bodies, each arch notch having an integral T-shaped projection of a thickness greater than the thickness of a CD box, the T-shaped projections being engageable within the vertical channels of the column bodies, each T-shaped projection including an upper locating hole and a lower tenon, the tenons of the projections of one plate being engageable within the locating holes of an adjacent plate to permit the plates to be vertically stacked along the column bodies, the T-shaped projections of each plate being inclined with respect to the plate, and the T-shaped projections of the front arch notches of a bottommost plate being engageable against the T-shaped pad blocks of the front column holes and the T-shaped projection of the back arch notch of the bottommost plate being engageable within the arch recess of the back column hole, thereby disposing a plurality of the stacked plates at an inclination from the back column body towards the front column body to define a plurality of inclined spaces between adjacent plates for receiving and supporting CD boxes therein.

2. The stackable CD rack of claim 1 further including a filler block for engaging each channel at a top end of each column body to prevent detachment of the supporting plates.

3. The stackable CD rack of claim 1 wherein the base body further includes a rectangular sink having a downwardly sloping bottom face for receiving a lowermost CD box.

4. The stackable CD rack of claim 1 wherein a top end of each front column body is engageable within the lower cavity of each front column hole and a top end of each back column body is engageable within a bottom portion of each back column hole for permitting plural sets of column bodies to be vertically stacked upon each other.

* * * * *